United States Patent
Lin et al.

(10) Patent No.: US 6,763,127 B1
(45) Date of Patent: Jul. 13, 2004

(54) APPARATUS AND METHOD FOR FINGERPRINT RECOGNITION SYSTEM

(75) Inventors: Shang-Hung Lin, San Jose, CA (US); Hung-Min Jen, Sunnyvale, CA (US)

(73) Assignee: IC Media Corporation, Santa Clara, CA (US)

( * ) Notice: Subject to any disclaimer, the term of this patent is extended or adjusted under 35 U.S.C. 154(b) by 614 days.

(21) Appl. No.: 09/680,999

(22) Filed: Oct. 6, 2000

(51) Int. Cl.$^7$ .............................................. G06K 9/00
(52) U.S. Cl. ................. 382/125; 382/257; 382/258; 382/259; 382/260; 382/263; 382/264; 382/274
(58) Field of Search ................. 382/115, 124, 382/125, 126, 127, 254, 255, 256, 257, 258, 259, 260, 261, 263, 264, 265, 267, 274, 275, 165, 167; 283/68, 69, 70, 78; 340/5.53, 5.83; 707/3; 358/519

(56) References Cited

U.S. PATENT DOCUMENTS

| | | | |
|---|---|---|---|
| 5,613,014 A | | 3/1997 | Eshera et al. |
| 5,613,571 A | | 3/1997 | Rank et al. |
| 5,631,972 A | * | 5/1997 | Ferris et al. ............... 382/125 |
| 5,841,888 A | | 11/1998 | Setlak et al. |
| 6,049,621 A | * | 4/2000 | Jain et al. ............... 382/125 |
| 6,072,895 A | * | 6/2000 | Bolle et al. ............... 382/125 |
| 6,289,112 B1 | * | 9/2001 | Jain et al. ............... 382/116 |
| 6,460,127 B1 | * | 10/2002 | Akerib ............... 712/10 |

OTHER PUBLICATIONS

Baxes, Gregory A. ( Digital image processing: prinicples and applications / Gregory A. Baxes, TA1637. B39 1994).*
Costlow, Terry. "EEs Shake Hands with the Sweat Guy." Electronic Engineering Times, Nov. 8, 1999, p. 153–154.
Quan, M. "Fingerprint ID System Gets Embedded." Electronic Engineering Times, Nov. 29, 1999, p. 49–50.

* cited by examiner

Primary Examiner—Timothy M. Johnson
Assistant Examiner—Ali Bayat
(74) Attorney, Agent, or Firm—Fernandez & Associates, LLP; Dennis S. Fernandez

(57) ABSTRACT

A fingerprint recognition method includes iterative gamma correction that compensates moisture effect, feature extraction operations, directional morphological filtering that effectively links broken ridges and breaks smeared ridges, adaptive image alignment by local minutia matching, global matching by relaxed rigid transform, and statistical matching with Gaussian weighting functions.

11 Claims, 2 Drawing Sheets

APPARATUS AND METHOD FOR FINGERPRINT RECOGNITION SYSTEM

FIELD OF INVENTION

Invention relates to fingerprint recognition and more particularly to fingerprint recognition where only a partial fingerprint is obtained.

BACKGROUND OF INVENTION

Conventional methods for fingerprint recognition rely on the center of the fingerprint whorl (cores) or the place where three different fingerprint ridge flows intersect (deltas) to align the test image with the reference image.

Prior art methods are inadequate where only a partial fingerprint is acquired.

Therefore, there is a need for a fingerprint recognition method that can extract useful fingerprint information when a partial fingerprint is acquired.

SUMMARY OF INVENTION

A method for fingerprint recognition comprises the steps of feature extraction and pattern recognition.

During feature extraction, an iterative gamma correction process using two available gamma curves are adopted to compensate the moisture effect of the fingerprint image. Dynamic thresholding and ridge flow extraction is applied to each 8×8 image block to assign intensity values and develop a directional map. Directional morphological filtering is applied to link the broken ridges.

During pattern recognition, an adaptive pattern alignment technique uses every minutia point on the fingerprint as a reference point for alignment.

DETAILED DESCRIPTION OF PREFERRED EMBODIMENT(S)

Figure 1:
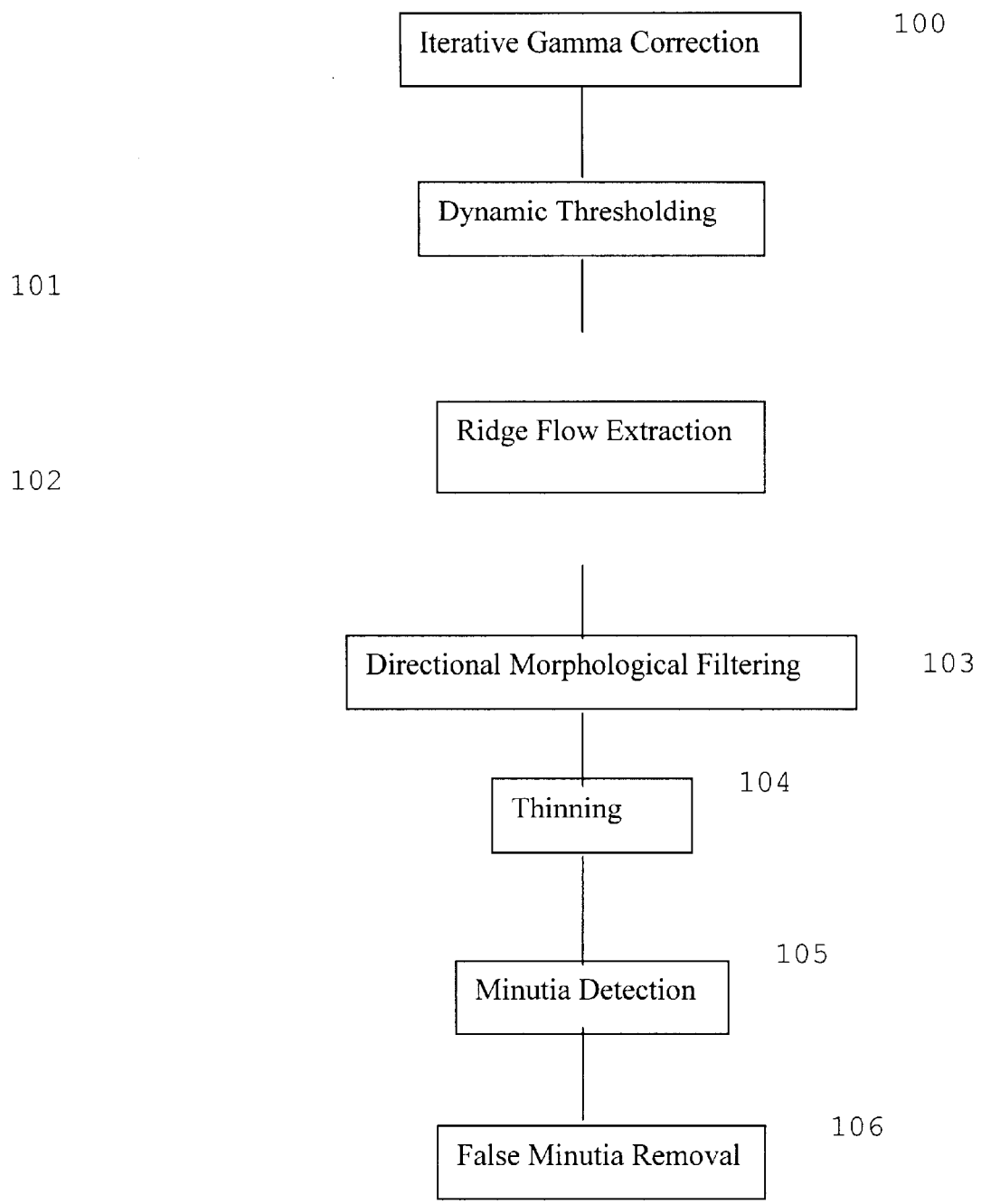
FIG. 1 is flow chart of fingerprint feature extraction procedure.
Figure 2:
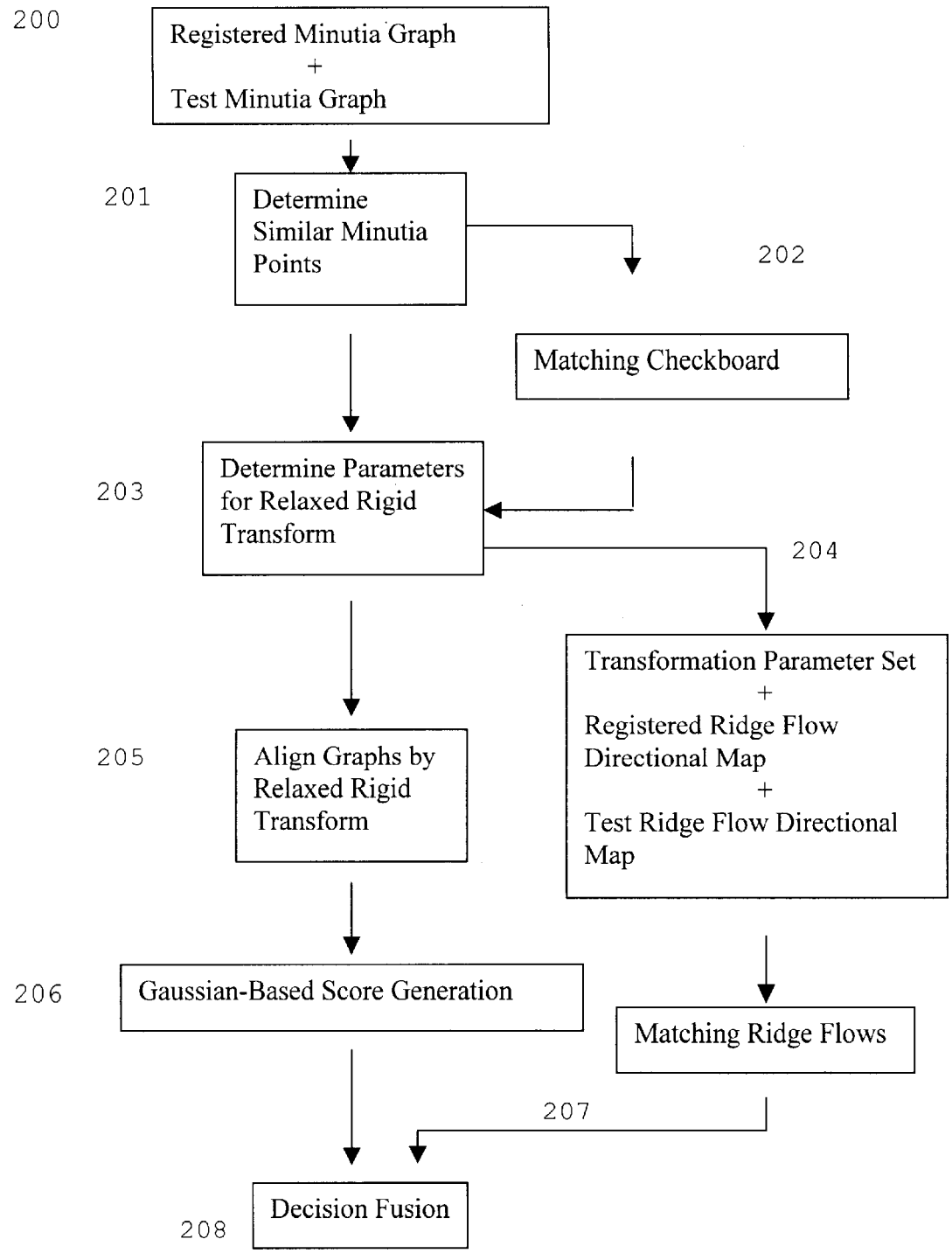
FIG. 2 is flow chart for fingerprint recognition procedure.

The fingerprint recognition method embodies the processes of feature extraction and pattern recognition.

The fingerprint extraction process embodies the following steps:

1. Iterative gamma correction. In step 100, lookup tables containing gamma correction curves are adopted to compensate for the moisture effect on a fingerprint image. Proper gamma correction curve is used on each image pixel until the average pixel intensity value falls within a predefined region.
2. Dynamic thresholding. In step 101, For each 8 bit×8 bit block of image, an average intensity value is calculated by simple addition of the intensity values then divided by sixty four, the number of bits in an 8×8 bit block. If the intensity value of a pixel in this 8 bit×8 bit block is above the average calculated intensity value its binary value is assigned to zero. Otherwise, its binary value is assigned to one.
3. Ridge flow extraction. At step 102, eight sets of 16×1 directional filters are applied to each 8×8 block. A directional code is assigned to this block based on the filter response. For an N×N image, an N/8×N/8 directional map is generated.
4. Directional morphological filtering. In step 103, a series of morphological filtering is applied to link the broken ridges and to break falsely connected ridges that may be caused by moisture.
5. Thinning. In step 104, thinning is performed.
6. Minutia detection. In step 105, minutia detection is performed.
7. False minutia removal. In step 106, false minutia removal is performed.
   a) Pore removal by ridge tracing. Ridges are traced to locate and delete pores.
   b) Fork point retrieval. If several end minutia points are in close region and if there is no ridge in between the points and their orientations satisfy defined conditions, then these end points are merged into a fork minutia point.

After feature extraction is accomplished, a feature file having a size of approximately 400 bytes is generated and stored in a database. This feature file represents one fingerprint.

The recognition process comprises the following steps:

1. In Step 203, Relaxed Rigid Transform is performed. A rigid transform is a constraint form of affine transform. If a two dimensional object defined as "A" can be transformed to object "B" by applying a series of rotation, translation, and shearing transformation, then "A" can be changed to "B" by one affine transform:

$$\begin{bmatrix} X \\ Y \end{bmatrix} = \begin{bmatrix} a & b \\ c & d \end{bmatrix} \begin{bmatrix} x \\ y \end{bmatrix} + \begin{bmatrix} Tx \\ Ty \end{bmatrix}$$

If a=d, b=−c, and a^2+b^2=1, then the transform is called "rigid transform". It can represent the combination of translations and rotations, but not shearing (distortion). In this algorithm, the rigid transform is relaxed to the following three constraints:

1. a=d
2. b=−c
3. (1−R)<=(a^2+b^2)<=(1+R)

The relaxed version allows a certain amount of distortion. Since the human finger may change shape (distortion) when it is pressed on the sensor surface, the relaxed rigid transform is more suitable than affine or rigid transforms.

In normal conditions (i.e., non-degenerated cases), two sets of (X, Y, x, y) are sufficient to create a set of transformation parameters and thus one such set can be used to align the test and the reference images for comparison.

2. Adaptive image alignment occurs in Step 205. To align two fingerprint images, matching minutia pairs are found for the relaxed rigid transform. A "matching checkboard" is created for recording the pairs. For example, the test image T has N minutia points and the reference image R has M points. The checkboard size will be N×M. For every minutia point in the test image T, points in the reference image R are found such that both points have the same type and their neighboring points are similar, which occurs in Step 201. The pairs that satisfy both conditions are recorded in the checkboard, as shown in Step 202.
3. Gaussian-based score generation occurs in Step 206. Ideally if the two minutia points in both pairs are from the same minutia on a finger, then all of the minutia points in the test image will overlap the points in the reference image once the transform is applied. However, due to many variations such as image noise, finger moisture or distortion caused by pressure, a statistical model is applied to the recognition process. A gaussian-distributed weighting function is applied to each minutia point in the reference image.

If, after transformation, the point in the test image falls in close range of a point in the reference image and they are of the same type and orientation, it will generate a high matching score. Otherwise it creates a low or zero score. The covariance matrix of each gaussian weighting function may be different; for example, if a point in reference image is far away from the point that generates this set of transformation parameters, its gaussian kernel may be larger than the ones who are closer. To compensate the distortion effect, the shape of the gaussian function is changed to a non-unity covariance matrix.

4. Matching ridge flows: In Step 204, the same set of transformation parameters from minutia matching is also applied to the ridge flow map. The correlation between reference fingerprint and the transformed test fingerprint is served as another matching score.

The final matching score of fingerprint recognition is the combination of the scores from minutia matching and from ridge flow matching, which occurs in Step 207. The combination method can be either averaging, weighted sum, softmax, or fuzzy decision fusion.

Averaging and weighted sum methods use strict boolean mathematical rules to draw true/false conclusions when matching scores.

The softmax method derives from log-linear models of the scores from minutia and ridge flow matching, and leads to interpretations of the weights of the scores in terms of odds ratios.

As shown in Step 208, fuzzy decision fusion is a methodology to draw conclusions from vague, ambiguous or imprecise information. With fuzzy decision fusion, ridge flow matching incorporates a higher lever of abstraction more closely resembling human subjective concepts.

Foregoing described embodiments of the invention are provided as illustrations and descriptions. They are not intended to limit the invention to precise form described.

In particular, Applicants contemplate that functional implementation of invention described herein may be implemented equivalently in hardware, software, firmware, and/or other available functional components or building blocks.

Other variations and embodiments are possible in light of above teachings, and it is thus intended that the scope of invention not be limited by this Detailed Description, but rather by Claims following.

What is claimed is:

1. A method for creating a digital reproduction of a fingerprint image, wherein the fingerprint image is a grayscale image, the method comprising the steps:

applying a plurality of directional filters to said image to generate a directional code map;

applying at least one morphological filter to reconstruct broken elements of said image;

applying iterative gamma correction to the fingerprint image pixels, said pixels recursively map to the gamma tables until the average intensity of the image value falls within a predefined region;

averaging pixel intensity for an 8×8 bit block and assigning a binary value to the pixel;

applying thinning;

minutia detection; and deleting false minutia.

2. The method according to claim 1 wherein the gamma correction is 1.2.

3. A method according to claim 1 wherein the gamma correction is 0.8.

4. A method according to claim 1 wherein eight sets of 16×1 directional filters are used.

5. A method for matching a fingerprint to a known fingerprint from a fingerprint file, the method comprising the steps:

selecting similar minutia points in two fingerprint images by applying adaptive image alignment based on point type and similarity of neighboring points to generate a matching checkboard for minutia pairs; and applying a relaxed rigid transform to said minutia pairs from said matching checkboard.

6. The method according to claim 5 further comprising the steps of:

assigning a gaussian-based score generation to said minutia pairs;

matching ridge flows from said minutia pairs using said relaxed rigid transform;

repeating said steps of selecting similar minutia points, applying relaxed rigid transform, assigning a gaussian-based score and matching ridge flows, at least until no minutia pairs remain; and combining said gaussian-based scores.

7. The method according to claim 6 wherein the combining of gaussian-based scores are averaged.

8. The method according to claim 6 wherein the combining of gaussian-based scores are combined by weighted sum.

9. The method according to claim 6 wherein the combining of gaussian-based scores are combined by softmax.

10. The method according to claim 6 wherein the combining of gaussian-based scores are combined by fuzzy decision fusion.

11. The method according to claim 6 further comprising the step:

matching the gaussian-based score of the fingerprint image with a known fingerprint.

* * * * *